United States Patent [19]

Angstadt

[11] 3,733,172

[45] May 15, 1973

[54] METHOD AND APPARATUS FOR AUTOMATIC CLEANING OF COFFEE ROASTERS

[75] Inventor: John W. Angstadt, Williamsville, N.Y.

[73] Assignee: Blaw-Knox Food and Chemical Equipment, Inc., Buffalo, N.Y.

[22] Filed: Nov. 9, 1970

[21] Appl. No.: 87,790

[52] U.S. Cl. ................. 432/41, 126/21 A, 432/75
[51] Int. Cl. ............................................... F27b 3/10
[58] Field of Search .......................... 263/10, 40, 43; 126/21 A, 19 R

[56] References Cited

UNITED STATES PATENTS

| | | | |
|---|---|---|---|
| 2,887,383 | 5/1959 | Kopf | 126/21 A |
| 3,191,590 | 6/1965 | Haley | 126/19 R |
| 3,590,804 | 7/1971 | Welshofer | 126/21 A |

Primary Examiner—John J. Camby
Attorney—Marn & Jangarathis

[57] ABSTRACT

The presence of oils, tars, steam and chaff in the recirculating gases of high-velocity, low-temperature coffee roasters requires frequent shut-downs for mechanical cleaning purposes. With associated cooling-off and heating-up periods, the production loss is significant. The present invention provides means for periodically cutting off the flow of beans to the roaster and heating the gas recirculation portions to the ignition temperature of the deposited by-products (a temperature of from about 500° to 800°F., depending on whether the by-products are light and fluffy or baked on like varnish). After combustion is complete, proper roasting temperatures and atmospheres are restored, and roasting is recommenced. In addition to minimizing down time, the invention more effectively cleans the roaster and prolongs equipment life by reducing metal fatigue resulting from thermal cycling.

3 Claims, 3 Drawing Figures

Fig. 1.
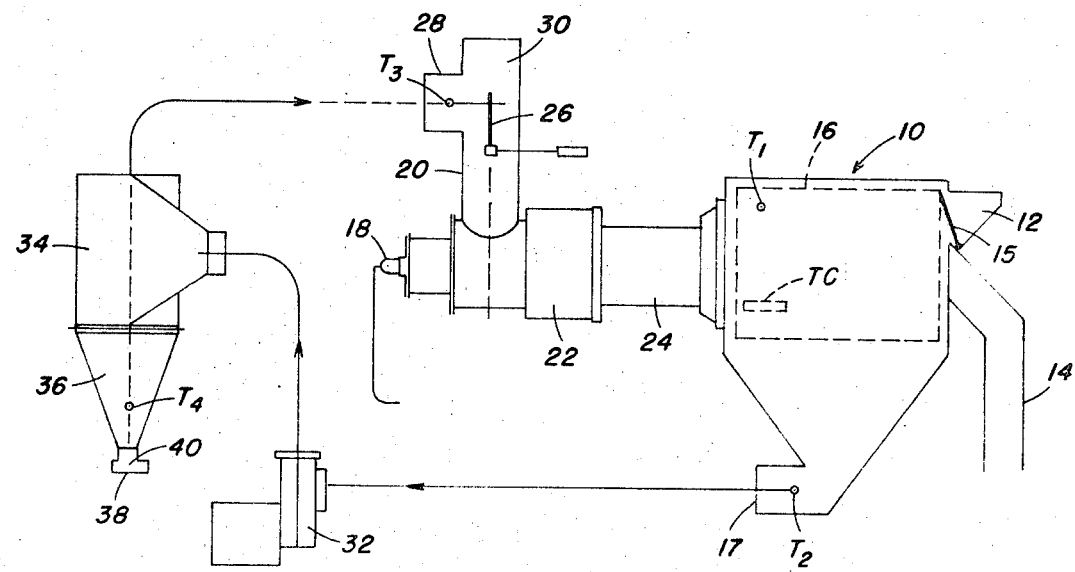
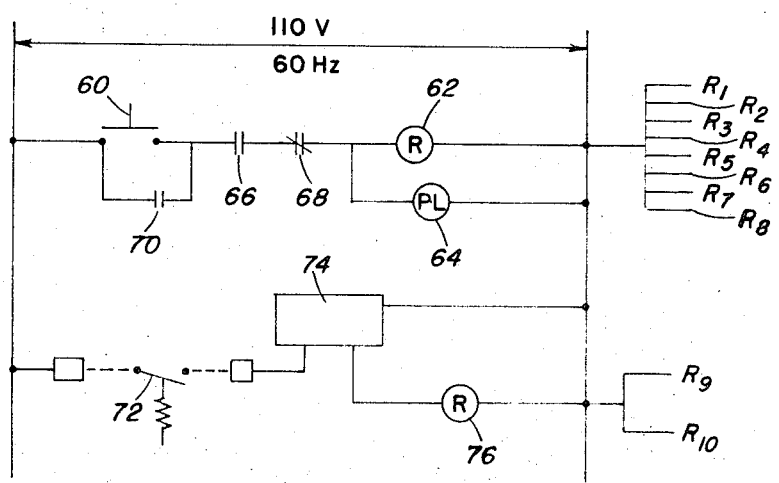
Fig. 3.
INVENTOR.
John W. Angstadt
BY
Marn & Jangarathis
ATTORNEYS

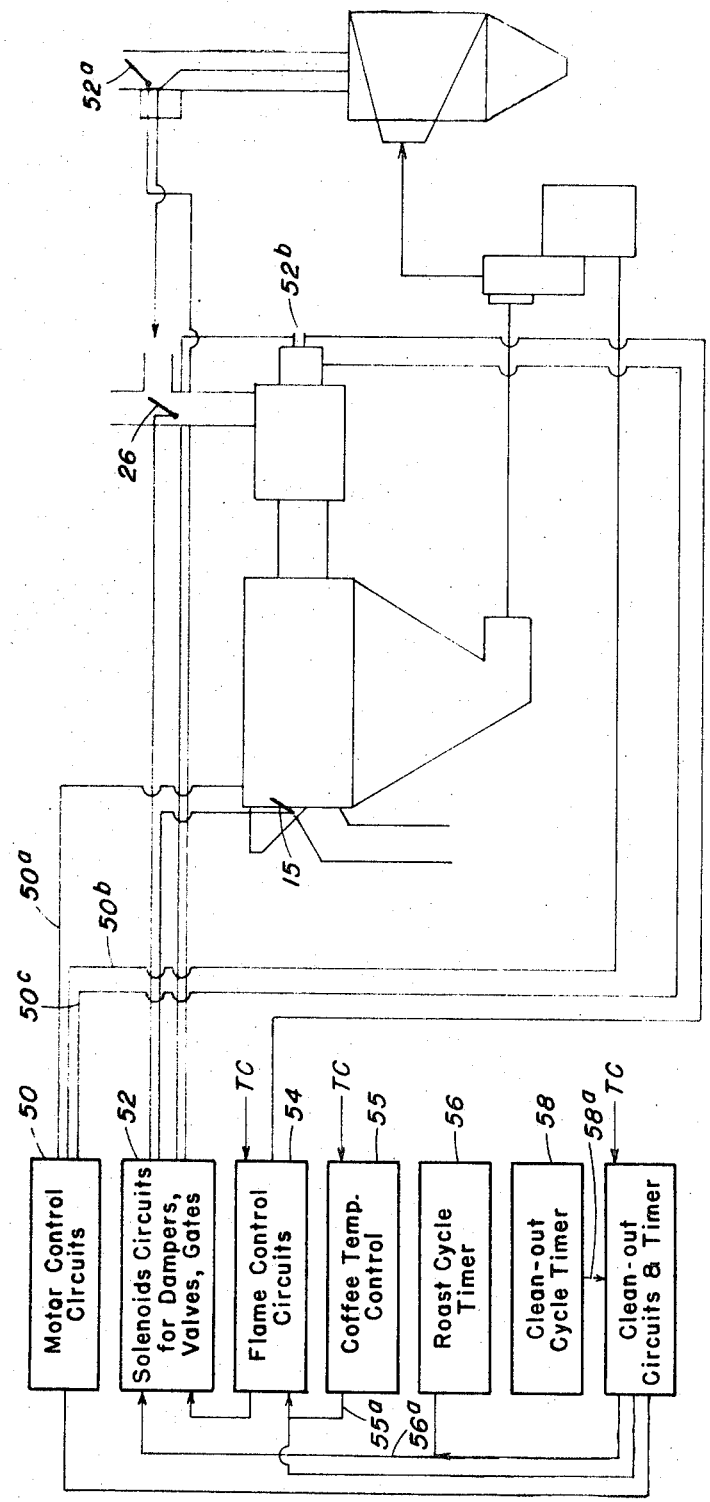

METHOD AND APPARATUS FOR AUTOMATIC CLEANING OF COFFEE ROASTERS

BACKGROUND OF THE INVENTION

This invention relates generally to coffee roasting machines and, more particularly, to coffee roasters wherein heat is transferred to the coffee beans by means of a heated, high-velocity gas stream. Such roasters are in common use today. Of course, it will be appreciated that the invention is applicable to roasting cocoa beans, peanuts and other bean-like materials, however, in the interest of clarity the invention will be described with reference to roasting coffee beans. Generally speaking, a burner combusts a suitable fuel in air to provide a hot gas stream at a temperature in the range of 600° to 1200°F., usually 600° to 800°F. This is introduced into a perforated rotating chamber or kiln containing the coffee beans. Agitation of the beans by lifters or vanes positioned within the chamber provides for substantially uniform heat transfers to the beans. After the beans reach a predetermined temperature, water sprays meter a controlled volume of water on them, stopping development at the desired color and restoring moisture lost during roasting. Excess steam escapes through the vent pipe. The roasting process is dependent, of course, on both time and temperatures. However, to minimize the loss of aromatic oils and preserve the glossy finish on the beans, lower temperatures are preferred. To roast the beans at low temperatures in a reasonable time, i.e., for high production capacity, sensible heat must be transferred to the beans as quickly as possible. For this reason, high velocity gas streams are preferred. Typically, air will be at 800°F. at the beginning of a roast and about 1200°F. at completion as it is introduced into the roaster. Exhaust gas temperatures will vary between 200° and 400°F. over the same period, and enters the recirculation system. Production can vary between 2,000 and 6,000 pounds per hour, depending on the size of the roaster and type of roast desired.

The coffee fruit comprises a pericarp surrounding the central albumin or grain, but separated therefrom by the silver skin or tegument. The pericarp comprises three distinct layers: an outer exocarp, an intermediate mesocarp and an interior endocarp or parchment. The parchment and silver skin are substantially similar and are often considered together. Prior to roasting, the pericarp is removed, although a certain amount of the parchment layer, and the silver skin, are retained. During roasting, water vapor is driven out of the bean, and the bean swells. The combination of dehydration, swelling and the agitation accompanying roasting, causes the silver skin (and/or parchment) to lose its structural integrity, flaking off the bean and forming dust and chaff. This material lodges in the perforations of the roaster or is suspended in the recirculating gas stream.

Oils, tars, and waxes are also evolved from the bean during roasting. Thus, during the course of the roasting operation, the gas stream picks up a variety of by-products, both gaseous and particulate.

The gases leaving the roaster are passed through a cyclone or other suitable solids separator wherein particulate material is removed from the gaseous stream. Unfortunately, oils and tars are condensed on the inside of the recirculation system. The latter condensates, being tacky, will mechanically hold dust and chaff particles. Residues also build up in the roaster chamber, clogging the perforations therein. Consequently, frequent shut-downs for cleaning are necessitated to maintain operating efficiency and avoid fire risks.

This problem has become more serious in recent years, as coffee producers, for economic reasons, have turned to lower-grade coffee beans. Such lower-grade coffee beans produce a significantly larger percentage of by-products during roasting thereby magnifying the cleaning problem.

While there are many patents and literature references to the design and operation of coffee roasters and like devices, these references are devoid of discussions relating to maintenance of the machines. However, U.S. Pat. No. 1,991,190 of Backer et al is of interest, in that it describes the high-velocity low temperature type of roaster used in the present invention.

OBJECTS OF THE INVENTION

It is a general object of the invention to provide a process and apparatus for periodically cleaning coffee roasters.

A further object of the invention is to provide a safe method of periodically removing by-products from coffee roaster gas recirculation systems by controlled combustion thereof.

A further object of the invention is to provide a safe method of periodically removing by-products from coffee roaster gas recirculation systems which requires less time and is more efficient than manual methods, and which prolongs equipment life.

A still further object of the invention is to provide apparatus which, when installed on a coffee roaster having a gas recirculation system, will carry out the foregoing objects on an automatic or semi-automatic basis.

Various other objects and advantages of the invention will become clear from the foregoing detailed description of an embodiment thereof, and the novel features will be particularly pointed out in connection with the appended claims.

THE DRAWING

Understanding of the invention will be facilitated by referring to the accompanying drawings, wherein:

FIG. 1 is a simplified schematic diagram of a low-temperature, high-velocity coffee roaster;

FIG. 2 is a schematic diagram similar to FIG. 1 and showing a block form, greatly simplified, the ordinary control circuitry plus that of the invention; and FIG. 3 illustrates typical circuitry for carrying out the invention.

DESCRIPTION

In essence, the present invention comprises raising the temperature of the air in an empty roaster to within the range of 500° to 800°F. for a period of up to 15 minutes. Frequency of clean-out will vary, but once per 24 hours of operation has been found satisfactory in many instances. It was determined in one installation that a temperature of about 780°F. removed all deposits in the interior of the roaster in about 6 minutes.

Referring to FIG. 1, which is a schematic illustration of a coffee roaster installation of the low-temperature, high velocity type, there is provided a roaster generally indicated as 10. Roaster 10 has a bean charging chute 12 and a discharge chute 14 at one end thereof. A swing gate 15 controls the rate of discharge and charge of the beans. Inside the roaster 10, there is provided a perforated, rotatable roaster cylinder 16, generally indicated by dotted lines. Spent roaster gases pass through cylinder 16 and exit roaster 10 from a gas discharge outlet 17 formed on the bottom of roaster 10. A temperature sensor $T_1$, in roaster 10, monitors incoming gas temperature, and modulates the gas supply to prevent overheating of roaster cylinder 16. Sensor $T_2$, near outlet 17, is connected to a high-temperature limit switch. Temperature sensor $T_3$ indicates when the recirculation system has been brought to clean-out temperature and starts the clean-out cycle timer, as more fully explained below. A fourth sensor, $T_4$, was located in the last portion of the recirculation system to reach clean-out temperature for test purposes only, and would not ordinarily be required. A separate thermocouple TC inside the roaster cylinder senses temperature of the beans.

Discharge chute 14 passes the roasted beans to suitable coolers (not shown).

Hot gases are supplied to roaster 10 by means of a gas introduced into burner 18, which gas is burned in the presence of air supplied by an air conduit 20 in a muffle 22. The hot combustion gases are passed from muffle 22 to roaster 10 via conduit 24, entering the roaster 10 at the end thereof opposite to the charge and discharge chutes. Air supply conduit 20 is provided with a movable damper 26 to proportion selectively, as desired, the quantity of gas in recirculating gas conduit 28 admixed with air in fresh air conduit 30. A temperature sensor $T_3$ is located in conduit 28 to monitor the temperature of the exhaust gas.

The gas recirculation system comprises conduits (not shown) connecting gas outlet 17 with recirculation fan 32, connecting the recirculation fan 32 with solids collector cyclone 34, and connecting the solids collector cyclone 34 with conduit 28. A cap 38 may be placed over a solids discharge port 40.

The roaster 10 is provided with the usual instrumentation and safety features, including motor circuits for recirculation fan 32, a blower in gas burner 18, a roaster cylinder drive and cooler fans. Solenoid circuits are provided for valves and dampers. Timing circuits are provided for roaster discharge, water spray, cooling time, the pilot flame and filter cleaning cycle. A flame safeguard relay is included and is responsive to both a flame temperature control and a roaster high temperature limit switch. A temperature recorder monitors the temperature of the beans and adjusts the flame accordingly.

Operation of a roaster in accordance with the invention may be visualized in a general way by referring to FIG. 2. It will be appreciated that FIG. 2 is greatly simplified, but the circuitry is conventional and well known in the art, and need not be described herein in detail.

Motor control circuits 50 are provided for cylinder rotation 50a, recirculation fan motor 50b and burner blower motor 50c. A plurality of solenoid circuits 52 control, inter alia, purge damper 26, swing gate 15, gas regulator 52a and a damper 52b in the collector gas outlet. Flame control circuits 54 provide for ignition, high and low fire and provides an input 54a to the gas regulator circuit 52a. A thermocouple (TC) senses bean temperature. A second thermocouple senses heat input, and control 55 regulates the flame via 55a.

The damper 26 is set to "purge" on start-up so that all unburned gases are removed before ignition. During roasting, the damper is set to permit recirculation of gases to meet the requirements of the circulating fan, excess gases escaping through the vent pipe 30. At the end of roasting, the damper is set to discharge all effluent during the spray period. The damper returns to circulate position when gas is turned on at start of the next cycle. The damper is on "circulate" during the entire clean-out period.

A roast cycle timer 56 provides an input for the circuitry controlling swing gate 15.

All of the foregoing is deemed to be more or less standard equipment. To effect automatic or semi-automatic operation of the cleaning cycle, according to the invention, additional circuitry is required.

A clean-out cycle timer 58 is required. The frequency of clean-out will vary with operating conditions and the type of bean being treated. However, a daily operation of the cycle has been found to be satisfactory where the roaster is in continuous use. This timer merely flashes a warning light to the operator that the roaster is due for clean-out. Alternatively, timer 58 can start clean-out directly, as shown at 58a.

Normally, the roaster is operated automatically, i.e., the roaster discharge timer controls discharging and charging of the machine, and keeps it continually on stream. When the clean-out cycle timer 58 indicates that clean-out is due, which will ordinarily occur during a roasting cycle, operation is first switched from automatic to manual. This will allow the roaster to finish the cycle and discharge the roasted beans, but prevents the roaster swing gate from setting the trigger to load another batch to the roaster.

When the roaster is discharged, the roaster discharge timer is not reset, because operation is on manual, the recirculation fan stops, and a bleed valve on the gas regulator is energized. The clean-out cycle may now commence. Equipment therefor includes a clean-out timer, switches, panel indicators and circuitry for overriding certain of the normal operating controls, as described below with reference to FIG. 3.

A key-operated start switch 60 energizes clean-out relay 62 and lights panel indicator lamp 64, contacts 66 and 68 being closed at this point. Line $R_1$ closes contact 70 to hold relay 62 in position. Normally, at the completion of each roast, the burner goes to low-fire. Line $R_2$ closes an interlock and turns off the "roasting on" panel light, and rests the flame to high-fire. Line $R_3$ opens the circuit containing the high temperature limit switch, preventing the latter from turning off the flame during clean-out. Line $R_4$ energizes a relay in the high-temperature limit switch circuit which prevents water sprays from being activated after clean-out and before the roaster has cooled down. Line $R_5$ opens a contact in the coffee temperature control circuit, thus overriding this function. Line $R_6$ closes a contact, restarting clean-out cycle timer 58 (FIG. 2). Line $R_7$ opens contacts preventing swing gate 15 from charging coffee to the roaster, even if the "start" switch is pressed in error. Line $R_8$ restarts circulating fan 32. While the roaster is heating, the operator should change the set point on the flame temperature control to 1,000°F. When the proper clean-out temperature is reached, sensor $T_3$ closes switch 72, starting clean-out timer 74. Clean-out proceeds for the prescribed time period. Some actual tests are described below.

At the end of the cycle, timer 74 energizes relay 76. Line $R_9$ opens contact 68, de-energizing relay 62, and line $R_{10}$ opens a contact in the flame control circuit, shutting down the burner.

De-energizing relay 62 re-sets all functions for normal operation. However, certain functions should not be re-started until the roaster has cooled to normal temperatures. Since the high-temperature limit switch will close during clean-out (with no effect), this is made to energize a relay which prevents actuation of water sprays and the coffee temperature controller until the roaster cools down and the limit switch opens.

Under normal operation, the flame safeguard relay will commence a roaster purge cycle whenever the burner shuts off; this is obviously desired after the clean-out cycle. When the purge is complete the burner is relighted in low-fire, the flame temperature controller set point is re-set to normal, and when the roaster temperature is at a proper roasting level, green coffee beans are then charged in the usual manner.

It will be appreciated that the foregoing describes what is essentially a semi-automatic operation of the clean-out cycle, i.e., the cycle timer merely signals the operator, who initiates the cycle and makes certain adjustments. Those skilled in the instrumentation art will realize that operation of the clean-out cycle could be performed entirely manually by providing manually operated switches for the various circuits, or it could be performed entirely automatically by having the cycle timer energize the start switch, and providing circuitry to take over all adjustments and override the normal functions. Inasmuch as temperatures in the recirculation system are well above normal operating temperatures, and combustion is taking place within the whole roaster installation, it is felt that the presence of an operator provides an extra margin of safety, and the semi-automatic system is preferred.

Two commercial roasters were shut down and thoroughly cleaned. Circuitry was installed on one roaster for semi-automatic clean-out in accordance with the invention. It was found that in spite of manual cleaning, combustible residues accumulated in presumably inaccessable places and the first few clean-out cycles had to be very carefully monitored to prevent uncontrolled combustion. These initial runs also disclosed many holes, open seams and leaky flanges, which had previously been sealed with residues. After this break-in period, tests were carried out on a daily basis for three days. Clean-out time (burner-on to burner-off) was varied in the range of 5 to 15 minutes, and periods of 6 to 10 minutes were found satisfactory. Total downtime (roaster discharge to roaster charge) was about 10 to 20 minutes depending on time of roaster burnout. Temperatures within the roaster reached 700° to 750°F. (sensor $T_1$), off-gas temperature reached 780°F. (sensor $T_2$), suction box temperatures reached 570°F. (sensor $T_3$), and collector temperatures reached 650° F. (sensor $T_4$). It will be appreciated that the number of roasts between clean-out, the temperature of clean-out and the length of the clean-out cycle are variables which must be determined for each installation. Experience to date indicates, however, that a clean-out every 50 to 70 roasts lasting 5 to 15 minutes and wherein the entire roaster reaches temperatures in the range of about 350° to 750°F. is satisfactory.

After the tests referred to above were completed, both roasters were inspected (the second roaster was operated during the same period as a control without any clean-out).

The roaster cylinder of the test unit was clean to bare metal, with 95–98 percent of the perforations open; the control unit had 30–40 percent of the perforations plugged. The cylinder housing of the test unit was clean, whereas the control unit had a one-eighth to one-fourth inch soft coating of ash and other residues. The circulating fan blades of both units were clean, but the control unit had a one-fourth inch coating on the hub. Piping was generally clean in both units. The collector in the test unit was very clean, whereas the control unit had a soft coating of residue up to one-half inch thick. The suction box of the test unit was clean, with some ash noticeable near the roaster end; the sides of the control unit's suction box had a soft coating, and there was some chaff accumulation.

In summary, the test roaster operated for 16 hours with a total downtime of 15 minutes, was clean at the end of the test period, and was operating with good efficiency throughout the test. The control unit required manual cleaning at the end of the test which, including cool-down and start-up, takes about 10 hours, and the services of a maintenance man.

In accordance with the invention, the roaster is substantially continuously at least at the roasting temperature, and is periodically heated to a somewhat higher temperature for clean-out. The roaster is cooled to room temperature only for extraordinary maintenance such as replacement of parts. Thus, the thermal cycling of a unit operated in accordance with the invention is actually less severe than when cooling to room temperature for cleaning. While life tests have not been completed, it is believed that roasters operated in accordance with the invention will last longer than roasters not so operated. Of course, it is necessary to be sure all parts of the installation subjected to clean-out are serviceable at the indicated temperatures; plain carbon steel construction is satisfactory, inasmuch as this material can be used safely at up to about 1,000°F.

Various changes in the details, steps, materials and arrangements of parts, which have been hereindescribed and illustrated in order to explain the nature of the invention, can be made by those skilled in the art within the principle and scope of the invention as defined in the appended claims.

What is claimed is:

1. Apparatus for periodically effecting clean-out of a coffee roaster having a charge container, burner means and a gas recirculation system, comprising:
   first timing means capable of indicating when said roaster is due for clean-out;
   means preventing further charging of coffee beans when clean-out is indicated;
   means capable of igniting said burner means when said charge container is empty;
   sensing means in said recirculation system for sensing the temperature thereof;
   second timing means responsive to said sensing means, and initiating a clean-out cycle when said charge container reaches a predetermined temperature, said second timing means also having means associated therewith for shutting off said burner on completion of said cycle; and
   means capable of purging combustion gases from said roaster on completion of said cycle.

2. The apparatus as claimed in claim 1, wherein said roaster is provided with a temperature limit switch controlling said burner, and additionally comprising a clean-out temperature limit switch and means capable of inactivating said temperature limit switch and activating said clean-out temperature limit switch during said cycle.

3. The apparatus as claimed in claim 2, and additionally comprising means associated with said second timing means for restoring all normal roaster functions upon completion of said clean-out cycle.

* * * * *